(12) United States Patent
Peer et al.

(10) Patent No.: US 8,143,202 B2
(45) Date of Patent: Mar. 27, 2012

(54) METHACRYLATE COPOLYMER POUR POINT DEPRESSANTS

(75) Inventors: William J. Peer, Patterson, NY (US); Eugene Scanlon, Mamaroneck, NY (US)

(73) Assignee: Ciba Corp., Tarrytown, NY (US)

( * ) Notice: Subject to any disclaimer, the term of this patent is extended or adjusted under 35 U.S.C. 154(b) by 502 days.

(21) Appl. No.: 11/978,765

(22) Filed: Oct. 30, 2007

(65) Prior Publication Data

US 2008/0108533 A1      May 8, 2008

Related U.S. Application Data

(60) Provisional application No. 60/994,335, filed on Sep. 18, 2007, provisional application No. 60/861,193, filed on Nov. 27, 2006.

(30) Foreign Application Priority Data

Nov. 7, 2006 (CA) ..................................... 2567235

(51) Int. Cl.
*C10M 145/14* (2006.01)
*C08F 20/10* (2006.01)

(52) U.S. Cl. ....................... 508/469; 526/318
(58) Field of Classification Search .................. 508/469; 526/318
See application file for complete search history.

(56) References Cited

U.S. PATENT DOCUMENTS

| | | | |
|---|---|---|---|
| 2,091,627 A | 8/1937 | Bruson | 87/9 |
| 2,100,993 A | 11/1937 | Bruson | 260/2 |
| 2,655,479 A | 10/1953 | Munday et al. | 252/56 |
| 3,642,633 A | 2/1972 | Eckert et al. | 252/57 |
| 3,729,296 A | 4/1973 | Miller | 44/62 |
| 3,816,315 A | 6/1974 | Morduchowitz et al. | 252/51.5 |
| 4,045,376 A | 8/1977 | Rubin et al. | 252/56 S |
| 4,146,492 A | 3/1979 | Cusano et al. | 252/56 |
| 4,867,894 A | 9/1989 | Pennewiss et al. | 252/56 |
| 5,188,770 A | 2/1993 | Pennewiss | 252/56 |
| 5,281,329 A | 1/1994 | Mueller et al. | 208/370 |
| 5,312,884 A | 5/1994 | Gore et al. | 526/328 |
| 5,368,761 A | 11/1994 | Gore et al. | 252/56 |
| 5,534,175 A | 7/1996 | Cantiani | 508/469 |
| 5,622,924 A | 4/1997 | Sakai et al. | 508/469 |
| 5,696,066 A | 12/1997 | Kinker et al. | 508/469 |
| 5,955,405 A * | 9/1999 | Liesen et al. | 508/469 |
| 6,255,261 B1 | 7/2001 | Liesen et al. | 508/469 |
| 6,586,375 B1 | 7/2003 | Gahagan et al. | 508/244 |
| 2005/0209112 A1* | 9/2005 | Clason | 508/378 |

FOREIGN PATENT DOCUMENTS

| | | |
|---|---|---|
| GB | 1 424 977 | 2/1976 |
| GB | 1 559 952 | 1/1980 |
| WO | 94/14860 | 7/1994 |

* cited by examiner

*Primary Examiner* — Walter D Griffin
*Assistant Examiner* — Vishal Vasisth
(74) *Attorney, Agent, or Firm* — Howard & Howard Attorneys PLLC

(57) ABSTRACT

Poly methacrylate copolymers are disclosed which comprising from about 60 to about 96 weight percent of a C12-C16 alkyl methacrylate and from about 40 to about 4 weight percent of a C18-C30 alkyl methacrylate and provide excellent low temperature properties to lubricating oils.

19 Claims, 1 Drawing Sheet

Pour Point in N100DW Oil

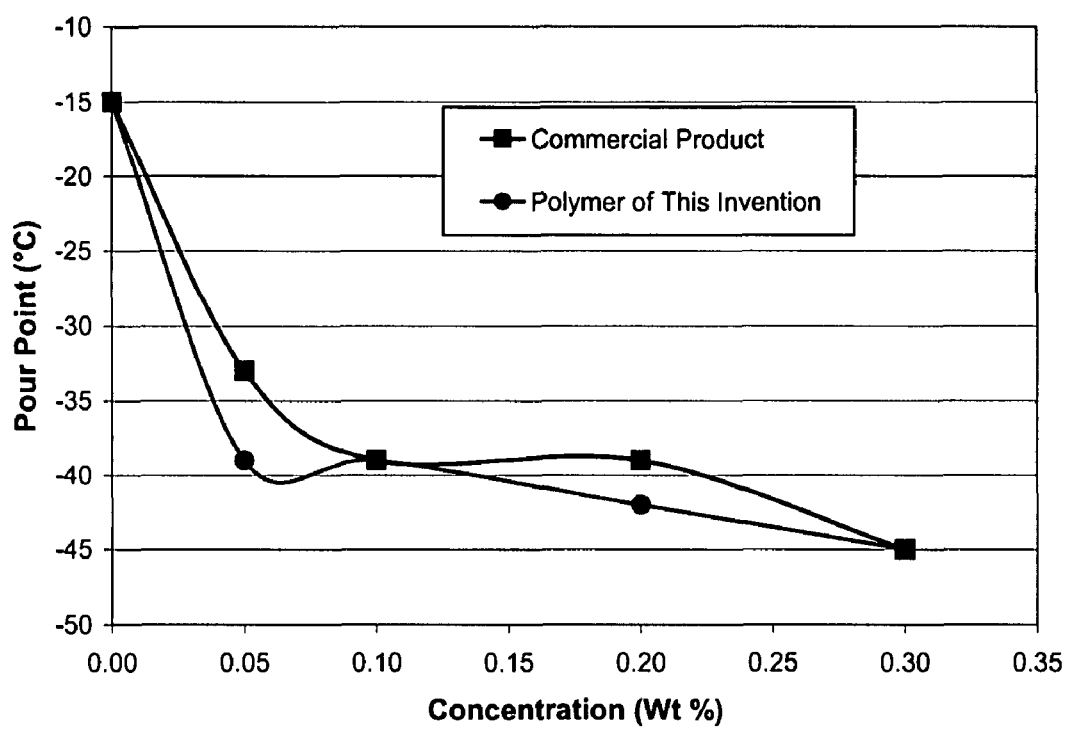

METHACRYLATE COPOLYMER POUR POINT DEPRESSANTS

This application claims the benefit of provisional application Nos. 60/994,335, filed Sep. 18, 2007 and 60/861,193, filed Nov. 27, 2006, all herein incorporated entirely by reference.

TECHNICAL FIELD

This invention relates to poly alkyl methacrylate copolymers having excellent low temperature properties. The present invention also relates to the use of these copolymers as pour point depressants or viscosity improvers at low temperatures for lubricating oils.

BACKGROUND OF THE INVENTION

Poly alkyl methacrylate pour point depressants are well known in the lubricating industry. Many attempts have been made to produce poly alkyl methacrylate pour point depressants that improve the low temperature viscometrics of various lubricating compositions.

Pour point depressant (PPD) additives improve the low-temperature performance of an oil by modifying the wax crystallization process. A wide variety of chemical types are currently available, and include poly alkyl methacrylates, styrenated polyesters, alkylated polystyrenes, ethylene-vinyl acetate, vinyl acetate-fumarate, esterified olefinic, styrene maleic anhydride, and alkylated naphthalenes. The present invention is directed to alkyl methacrylate polymers which exhibit desired low temperature properties. More specifically, the invention is directed to PPDs that exhibit outstanding low temperature properties in lubricating oils for applications such as automatic transmission fluids, manual transmission fluids, hydraulic fluids, greases, gear fluids, metal-working fluids, engine oil applications, crankcase motor oil and shock absorber fluids. The oil chemist is constantly searching for PPDs that achieve optimum low-temperature performance at low concentrations. The present invention addresses the need for an improved PPD.

In particular, the invention addresses the need for a pour point depressant which can be used in a variety of oils at lower treat rates, displays less interactions with other components of the oil such as dispersants and inhibitors, shows stability in shear fields and lower gelation indices in some instances depending on the base oil than for previous pour point polyalkylmethacrylates. It is also important that the PPD be soluble and compatible with the base oil and maintain an appropriate BROOKFIELD viscosity at low temperatures. Incorporation of the inventive poly alkylmethacrylates is shown to do just this; addition of the inventive poly alkylmethacrylates gives improved viscosity at low temperatures while maintaining acceptable pour point depressant activity.

U.S. Pat. No. 2,655,479 to Munday et al. claims a pour point depressant composition consisting of a blend of two copolymers, the first copolymer having an average side chain length of about 12.7 while the second copolymer has an average side chain length of about 11.2.

U.K. Patent No. 1,559,952 discloses a mixture of two classes of oil soluble poly alkyl methacrylates as pour point depressants.

U.S. Pat. No. 4,146,492 discloses lubricating oil compositions comprising between about 0.5 and 30 wt. % of a specifically defined ethylene-propylene copolymer and between about 0.005 to 10 wt. % of a neat interpolymeric poly alkyl acrylate of (A) C1-C15 alkyl acrylate and (B) C16-C22 alkyl acrylate having a weight ratio of A:B of between about 90:10 and 50:50, a molecular weight of from 1000 to 25,000 and an average alkyl side chain length of between about 11 and 16 carbons.

U.S. Pat. No. 4,867,894 discloses pour point improving additives for mineral oils comprising from 10 to 30 mole percent methyl methacrylate, 10 to 70 mole percent of a linear C16 to C30 alkyl methacrylate, from 10 to 80 mole percent of a C4-C15 linear alkyl methacrylate and/or a C4 to C40 branched methacrylate, and from 0 to 30 mole percent of a free-radically polymerizable nitrogen-containing monomer having dispersing action.

U.S. Pat. Nos. 5,312,884 and 5,368,761 disclose copolymers useful as pour point depressants for lubricating oils comprising 15-67 mole percent C8-C15 alkyl (meth) acrylates, 3-40 mole percent C16-C24 (meth)acrylates, and from greater than 30-65 mole percent C1-C4 methacrylates. These patents do not teach copolymers containing the specific monomers in the specific proportions required by the present claims.

U.S. Pat. No. 5,281,329 discloses copolymers useful as pour point depressants for oils containing at least two species of poly alkyl (meth)acrylate, one species having an onset of crystallization temperature above 15° C. and one species having an onset of crystallization temperature below 15° C.

U.S. Pat. No. 5,534,175 discloses copolymers of unsaturated fatty esters derived from 12-20 mass % of a C1-C3 (meth)acrylate, 45-72 mass % of a C11-C15 (meth)acrylate and 14-30 mass % of a C16-C25 (meth)acrylate.

EP 0 236 844 B1 teaches pour point improving agents derived from methyl methacrylate.

U.S. Pat. No. 6,255,261 discloses copolymers formed from 5 to 60 weight percent C11-C15 (meth)acrylates and 95 to 40 weight % C16-C30 (meth)acrylates for use as pour point depressants.

SUMMARY OF THE INVENTION

The present invention is directed to poly alkyl methacrylates and their use as pour point depressants for lubricating oils.

The poly alkyl methacrylate copolymers of the present invention comprise monomer units formed from:

(A) about 60 to about 96, weight percent of a C12-C16 alkyl methacrylate; and (B) about 40 to about 4, weight percent of a C18-C30 alkyl methacrylate.

The poly alkyl methacrylate copolymer architecture may be linear, crosslinked, structured or lightly structured.

The poly alkyl methacrylate copolymer formed as above is added to an oil of lubricating viscosity to form a lubricating oil composition.

Furthermore the composition above is used to improve the low temperature properties of a lubricating oil.

DESCRIPTION OF THE DRAWINGS

FIG. 1 illustrates pour point temperature as a function of concentration for the poly alkyl methacrylate of example 1 in an hydraulic oil compared to a commercial pour point depressant.

DETAILED DESCRIPTION OF THE INVENTION

The phrase "monomer units formed from" refers to the monomer units of the polymer formed after a monomer is reacted. For example, a C12-C16 alkyl methacrylate monomer will polymerize to give a polymer with a unit derived from C12-C16 alkyl methacrylate.

The term monomer by itself refers to the unpolymerized alkyl methacrylate.

Percentages are normally based on total weight unless specified otherwise.

When the term "copolymer" is used by the inventors, this refers to the poly alkyl methacrylate formed from monomer units derived from (A) and (B).

Molecular Weight

The copolymers of the present invention have a relative weight average molecular weight ranging from about 5,000 to about 250,000. Typically, the weight average may range from about 10,000 to about 200,000, from about 15,000 to about 150,000 and most typically from about 20,000 to about 130,000. The molecular weight distribution is usually less than 2.5 and generally ranges from about 1.5 to about 2.5.

The molecular weight is determined by GPC using a poly methyl methacrylate standard. The determined average molecular weight is therefore relative to the standard not absolute.

Linear, Crosslinked or Structured Copolymer

The architecture of the poly alkyl methacrylate copolymer may be linear, crosslinked, structured, lightly structured or branched.

When reference is made to the architecture of the copolymer, the inventors are discussing the backbone architecture of the copolymer.

The long chain alkyl ester of the methacrylate may be linear or branched.

Cross linking agents are usually polyethylenically unsaturated crosslinking agents.

Examples are methylene bis(meth)acrylamide, polyethyleneglycol diacrylate; polyethyleneglycol dimethacrylate; N-vinyl acrylamide; divinylbenzene; tetra (ethyleneglycol) diacrylate; diallyloctylamide; trimethylpropane ethoxylate triacrylate; N-allylacrylamide N-methylallylacrylamide, pentaerythritol triacrylate and combinations thereof. Other systems for crosslinking can be used instead of or in addition to this. For instance covalent crosslinking through pendant groups can be achieved, for instance by the use of ethylenically unsaturated epoxy monomers, or by the use of polyfunctional crosslinking agents other known crosslinking systems.

Variation in Components (A) and (B)

The component (A) may for example, vary from about 65 to about 95 weight percent or about 70 to about 95, about 80 to about 95, about 88 to about 95 weight percent of the formed poly alkyl methacrylate copolymer.

The component (B) may for example, vary from about 35 to about 5 weight percent, or about 30 to about 5, about 20 to about 5, about 15 to about 5, about 12 to about 5 weight percent of the formed poly alkyl methacrylate copolymer.

For purposes of the invention, weight percent of components (A) and (B) of the formed alkyl methacrylate is calculated by taking total weight of component (A) or (B) over the total weight of the formed polyalkyl methacrylate copolymer multiplied by 100. The basis weight of the formed copolymer is the copolymer per se and does not include the diluent.

Component (A)

As used herein, C12-C16 alkyl methacrylate means an alkyl ester of methacrylic acid having a straight or branched ester alkyl group of 12 to 16 carbon atoms such as, lauryl methacrylate, myristyl methacrylate, cetyl methacrylate, dodecyl methacrylate, tridecyl methacrylate, tetradecyl methacrylate, pentadecyl methacrylate, hexadecyl methacrylate and mixtures thereof.

The preferred source for the C12-C16 alkyl methacrylate esters is lauryl methacrylate which contains a mixture of methacrylate esters formed from a mixture of C12 to C16 alcohols. For example, about 60 to about 96 weight percent lauryl methacrylate esters, about 65 to about 95 weight percent lauryl methacrylate esters make up the formed poly methacrylate copolymer.

Alternatively, the weight percent for component (A) may vary as described above for lauryl methacrylate.

In the instance where lauryl methacrylate esters are used to make up component (A) of the polyalkyl methacrylate copolymers, the lauryl ester is derived from a straight or branched distribution of C12-C16 long chain alcohols. The weight percent compositions of the lauryl methacrylate esters may range as below:

Lauryl Methacrylate Distribution

| Chain length | Wt. % |
| --- | --- |
| C12 | 68-74 |
| C14 | 20-26 |
| C16 | 2-6 |

The weight percent of the various homologues in the lauryl methacrylate means weight percent on the basis of the total weight of the lauryl methacrylate. Thus if the total lauryl methacrylate fraction is 100 g and the C12 contribution is 68 g then the weight percent of the C12 is 68 weight % of the total lauryl methacrylate.

It is preferable that the alkyl chains of component (A) are substantially linear.

Furthermore, it is preferred that the C12-C16 esters contain only even ester chain lengths (C12, C14 and C16) but even and odd ester chain lengths (C12, C13, C14, C15 and C16) are also possible. In the case where only even chain lengths are used, the component (A) contains primarily C12, C14 and C16 esters.

Thus (A) may consist essentially of about 60 to about 96 weight percent C12, C14 and C16 alkyl methacrylates.

The C12 and C14 homologues will typically dominate the (A) fraction. For example at least about 80 wt. % of the (A) fraction is C12 and C14. Typically at least 85 to 88 wt. % of the (A) fraction is C12 and C14.

"Consists essentially of" for the purposes of the invention means that minor levels of other monomers, polymerizable with the alkyl methacrylates may be present as long as they do not adversely affect the low temperature properties of the fully formulated fluids.

The average chain length for the C12-C16 alkyl methacrylates of component (A) vary from about 12 to about 13 carbons.

Component (B)

As used herein, C18-C30 alkyl methacrylate means an alkyl ester of methacrylic acid having a straight or branched alkyl group of 18 to 30 carbon atoms per group such as, stearyl methacrylate, octadecyl methacrylate, heptadecyl methacrylate, nonadecyl meth acrylate, eicosyl methacrylate, henicosyl methacrylate, docosyl methacrylate, tricosyl methacrylate, tetracosylmethacrylate, pentacosyl methacrylate, hexacosyl methacrylate, octacosyl methacrylate, nonacosyl methacrylate, triacontyl methacrylate, behenyl methacrylate and mixture thereof.

A possible source for the C18-C30 alkyl methacrylate esters is behenyl methacrylate esters. Behenyl methacrylate used in the present examples contains a range of long chain methacrylate esters wherein the length of the ester chain ranges from C18 to C22. For example, about 40 to about 4 weight percent of the behenyl methacrylate esters make up the formed poly alkylmethacrylate copolymer. For example, 35 to about 5 weight percent, about 30 to about 5 or about 20 to about 5 of the formed poly alkyl methacrylate copolymer is formed from behenyl methacrylate esters.

In the instance where behenyl methacrylate esters are used to make up component (B) of the poly alkyl methacrylate copolymers, the behenyl esters may be derived from a C18-C22 distribution of long chain alcohols. The weight percent compositions of the behenyl methacrylate esters may range as below:

Behenyl Methacrylate Distribution

| Chain length | Wt. % |
|---|---|
| C18 | 40-50 |
| C20 | 5-15 |
| C22 | 40-50 |

When referring to distribution by weight percent of the particular ester in the behenyl methacrylate, the weight percent is based on the total weight of behenyl methacrylate.

Thus behenyl methacrylate may consist essentially of about 40 to about 50, preferably 42 to about 48 weight percent C18 alkylmethacrylate, about 5 to about 15, preferably 6.5 to about 12 weight percent C20 alkyl methacrylate and about 40 to about 50, preferably 42 to about 48 weight percent C22 alkyl methacrylate based on the total weight of behenyl methacrylate.

The behenyl methacrylate is substantially linear and contains primarily C18 to C22 alkyl methacrylates. Behenyl methacrylate may contain a small amount of C16. For example, behenyl methacryltate will normally contain less than 0.8 wt. % C16 or less than 0.5 wt % C16.

The C16 and C18 alkyl methacrylates cummulative weight percent in the formed copolymer generally will not exceed about 22 to 23% weight percent. For example, the combined weight percent of the C16 and C18 fractions may be about 15, 16, 17, 18, 19 or 21 weight percent of the formed alkyl methacrylate from components (A) and (B) with a minimum of at least 7, 8 or 9 weight percent for the cumulative weight percent of C16 and C18 alkyl methacrylates. For example, the (A) and (B) components are further defined as comprising a combined weight percent of C16 and C18 alkyl methacrylates which combined weight ranges from about a minimum of 7 weight percent to about a maximum of 23 weight percent based on the total weight of the poly methacrylate copolymer.

Furthermore, the alkyl methacrylates esters in component (B) which are equal to or greater than C20 makes up at least about 2 to about 40 weight percent of the formed poly alkyl methacrylate copolymer. For example, a minimum of about 2.5, 3, 3.5, 4, 4.5, 5, 6, 7 or 8 weight percent of the formed poly alkyl methacrylate copolymer is derived from C20 to C30 alkyl methacrylate esters. The formed poly alkyl methacrylate copolymer will typically be formed from a maximum of about 10, 20, 30 or 40 weight percent of C20 to C30 alkyl methacrylate esters.

Thus, the (B) components are further defined as comprising a combined weight percent of C20 to C30 alkyl methacrylates which weight ranges from about a minimum of 2 weight percent to about a maximum of about 40 weight percent based on the total weight of the poly alkyl methacrylate copolymer.

The C20-C24 homologues are preferred and the C20-C22 homologues are the most preferred homologues of component (B). Thus for example, the C20-C22 homologues may make up about 2 to about 40, about 4 to about 40 or about 4 to about 30 weight percent of the formed poly alkyl methacrylate copolymer. Typical weight ranges for the C20-C24 homologues are about 4 to about 40, about 4 to about 30 or about 5 to about 20 weight percent of the formed poly alkyl methacrylate copolymer.

The average chain length for the alkyl methacrylates of component (B) varies from about 20 to about 22 carbons or about 20 to about 21 carbons.

In a preferred embodiment the sum of (A) and (B) equals 100 weight percent of the formed poly alkyl methacrylate copolymer.

The poly methacrylate PPD copolymers according to the invention may or may not contain C1-C10 alkyl methacrylates esters, or other polymerizable non-alkyl methacrylate monomers.

The poly alkyl methacrylates may consist essentially of monomers (A) and (B). For example the sum of (A) and (B) equals 100%. Thus for example, the copolymer may not contain C1 to C10 alkyl methacrylates, C1 to C4 alkyl methacrylates or C1 to C6 alkyl methacrylates.

Preparation of Poly Alkyl Methacrylate PPD Copolymers

The alkyl methacrylate comonomers containing 12 or more carbon atoms in the alkyl ester group are generally prepared by standard esterification procedures using technical grades of long chain aliphatic alcohols. These commercially available alcohols are mixtures of alcohols of varying chain lengths containing between 12 and 30 carbon atoms in the alkyl groups. Consequently, for the purposes of this invention, alkyl methacrylate comonomers are intended to include not only the individual alkyl methacrylate esters named, but also to include mixtures of the alkyl methacrylate esters.

Conventional methods of free-radical polymerization can be used to prepare the copolymers of the present invention. Polymerization of the alkyl methacrylate monomers can take place under a variety of conditions, including bulk polymerization, solution polymerization, usually in an organic solvent, preferably mineral oil.

In the solution polymerization, the reaction mixture comprises a diluent, the alkyl meth acrylate monomers, a polymerization initiator and usually a chain transfer agent and optionally a crosslinker.

The diluent may be any inert hydrocarbon. The weight ratio of diluent to total monomer charge may range from about 90:10 to about 60:40. As used herein, "total monomer charge" means the combined amount of all monomers in the initial, i.e., unreacted, reaction mixture.

In preparing the copolymers of the present invention by free-radical polymerization the alkyl methacrylate monomers may be polymerized simultaneously or sequentially or the monomers may be fed over time to the reaction vessel. For example, the blend of C12 to C30 alkyl methacrylate monomers may be fed over time to a reaction vessel along with an initiator feed.

Suitable polymerization initiators include initiators which disassociate upon heating to yield a free radical, e.g., peroxide compounds such as benzoyl peroxide, t-butyl perbenzoate, t-butyl peroctoate and cumene hydroperoxide; and azo compounds such as azoisobutyronitrile and 2,2'-azobis (2-methylbutanenitrile). The mixture includes from about 0.01 wt % to about 5.0 wt % initiator relative to the total monomer mixture. For example, 0.02 wt. % to about 4.0 wt. %, 0.02 wt. % to about 3.5 wt. % are envisioned. Typically about 0.02 wt. % to about 2.0 wt. % are used.

Suitable chain transfer agents include those conventional in the art such as mercaptanes and alcohols. For example, tridecyl mercaptan, dodecyl mercaptan and ethyl mercaptan may be used as chain transfer agents. The selection of the amount of chain transfer agent to be used is based on the desired molecular weight of the polymer being synthesized as well as the desired level of shear stability for the polymer, i.e., if a more shear stable polymer is desired, more chain transfer agent can be added to the reaction mixture. The chain transfer agent is added to the reaction mixture or monomer feed in an amount of 0.01 to 3 weight percent relative to the monomer mixture.

By way of example and without limitation, all components are charged to a reaction vessel that is equipped with a stirrer, a thermometer and a reflux condenser and heated with stirring under a nitrogen blanket to a temperature from about 50° C. to about 125° C. for a period of about 0.5 hours to about 15 hours to carry out the polymerization reaction.

A viscous solution of the copolymer of the present invention in the diluent is obtained as the product of the above-described process.

To form the lubricating oils of the present invention, a base oil is treated with the copolymer of the invention in a conventional manner, i.e., by adding the copolymer to the base oil to provide a lubricating oil composition having the desired low temperature properties. The lubricating oil contains from about 0.01 to about 5.0 parts by weight, for example about 0.01 to about 2.0, more typically about 0.02 to about 0.5, of the neat copolymer (i.e., excluding diluent oil) per 100 weight of base oil. The preferred dosage will of course depend upon the base oil.

In a particularly preferred embodiment, the copolymer is added to the base oil in the form of a relatively concentrated solution of the copolymer in a diluent, The diluent oil may be any of the oils referred to below that are suitable for use as base oils.

Base Oils

Preferred base oils contemplated for use in this invention include mineral oils, poly-alpha-olefin synthetic oils and mixtures thereof. Suitable base oils also include basestocks obtained by isomerization of synthetic wax and slack wax, as well as basestocks produced by hydrocracking (rather than solvent extracting) the aromatic and polar components of the crude. In general, both the mineral and synthetic base oils will each have a kinematic viscosity ranging from about 1 to about 40 cSt at 100° C., although typical applications will require each oil to have a viscosity ranging from about 2 to about 20 cSt at 100° C.

The mineral oils useful in this invention include all common mineral oil base stocks. This would include oils that are naphthenic, paraffinic or aromatic in chemical structure. Naphthenic oils are made up of methylene groups arranged in ring formation with paraffinic side chains attached to the rings. The pour point is generally lower than the pour point for paraffinic oils. Paraffinic oils comprise saturated, straight chain or branched hydrocarbons. The straight chain paraffins of high molecular weight raise the pour point of oils and are often removed by dewaxing. Aromatic oils are hydrocarbons of closed carbon rings of a semi-unsaturated character and may have attached side chains. This oil is more easily degraded than paraffinic and naphthalenic oils leading to corrosive by-products.

In reality a base stock will normally contain a chemical composition which contains some proportion of all three (paraffinic, naphthenic and aromatic). For a discussion of types of base stocks, see *Motor Oils and Engine Lubrication* by A. Schilling, Scientific Publications, 1968, section 2.2 thru 2.5.

The poly alkyl methacrylate copolymer may be used in paraffinic, naphthenic and aromatic type oils. For example, the poly methacrylate copolymer may be used in Groups I-V base oils. These Groups are well known by those skilled in the art. Additionally, the poly methacrylate copolymer may be used in gas to liquid oils.

Gas to liquid oils (GTL) are well known in the art. Gaseous sources include a wide variety of materials such as natural gas, methane, $C_1$-$C_3$ alkanes, landfill gases, and the like. Such gases may be converted to liquid hydrocarbon products suitable for use as lubricant base oils by a gas to liquid (GTL) process, such as the process described in U.S. Pat. No. 6,497,812, the disclosure of which is incorporated herein by reference.

Base oils derived from a gaseous source, hereinafter referred to as "GTL base oils", typically have a viscosity index of greater than about 130, a sulfur content of less than about 0.3 percent by weight, contain greater than about 90 percent by weight saturated hydrocarbons (isoparaffins), typically from about 95 to about 100 wt. % branched aliphatic hydrocarbons, have a pour point of below −15 to −20 C.

The GTL base oils may be mixed with more conventional base oils such as Groups I to V as specified by API. For example, the base oil component of the lubricant compositions may include 1 to 100 percent by weight to a GTL base oil.

Thus a lubricating oil composition may be at least partially derived from a gaseous source and contain the instant polymethacrylate ester as a pour point depressant.

Oils may be refined by conventional methodology using acid, alkali, and clay or other agents such as aluminum chloride, or they may be extracted oils produced, for example, by solvent extraction with solvents such as phenol, sulfur dioxide, furfural, dichlordiethyl ether, etc. They may be hydrotreated or hydrorefined, dewaxed by chilling or catalytic dewaxing processes, or hydrocracked. The mineral oil may be produced from natural crude sources or be composed of isomerized wax materials or residues of other refining processes. The preferred synthetic oils are oligomers of a-olefins, particularly oligomers of 1-decene, also known as polyalphaolefins or PAO's.

The base oils may be derived from refined, re-refined oils, or mixtures thereof. Unrefined oils are obtained directly from a natural source or synthetic source (e.g., coal, shale, or tar sands bitumen) without further purification or treatment. Examples of unrefined oils include a shale oil obtained directly from a retorting operation, a petroleum oil obtained directly from distillation, or an ester oil obtained directly from an esterification process, each of which is then used without further treatment. Refined oils are similar to the unrefined oils except that refined oils have been treated in one or more purification steps to improve one or more properties. Suitable purification techniques include distillation, hydrotreating, dewaxing, solvent extraction, acid or base extraction, filtration, and percolation, all of which are known to those skilled in the art. Re-refined oils are obtained by treating used oils in processes similar to those used to obtain the refined oils. These re-refined oils are also known as reclaimed or reprocessed oils and are often additionally processed by techniques for removal of spent additives and oils breakdown products.

Optional Customary Oil Additives

The addition of at least one additional customary oil additive to the composition is possible. The mentioned lubricant compositions, e.g. greases, gear fluids, metal-working fluids and hydraulic fluids, may additionally comprise further additives that are added in order to improve their basic properties still further. Such additives include: further antioxidants, metal passivators, rust inhibitors, viscosity index enhancers, additional pour-point depressants, dispersants, detergents, further extreme-pressure additives and anti-wear additives. Such additives are added in the amounts customary for each of them, which range in each case approximately from 0.01 to 10.0%, preferably 0.1 to 1.0%, by weight. Examples of further additives are given below:

1. Examples of Phenolic Antioxidants:

1.1. Alkylated monophenols: 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(.alpha.-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear nonylphenols or nonylphenols branched in the side chain, such as, for example, 2,6-dinonyl-4-methylphenol, 2,4-dimethyl-6-(1'-methyl-undec-1'-yl)-phenol, 2,4-dimethyl-6-(1'-methylheptadec-1'-yl)-phenol, 2,4-dimethyl-6-(1'-methyltridec-1'-yl)-phenol and mixtures thereof;

1.2. Alkylthiomethylphenols: 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol;

1.3. Hydroquinones and alkylated hydroquinones: 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate;

1.4. Tocopherols: .alpha.-, .beta.-, .gamma. or .delta.-tocopherol and mixtures thereof (vitamin E);

1.5. Hydroxylated thiodiphenyl ethers: 2,2'-thio-bis(6-tert-butyl-4-methylphenol), 2,2'-thio-bis(4-octylphenol), 4,4'-thio-bis(6-tert-butyl-3-methylphenol), 4,4'-thio-bis(6-tert-butyl-2-methylphenol), 4,4'-thio-bis(3,6-di-sec-amylphenol), 4,4'-bis(2,6-dimethyl-4-hydroxy-phenyl) disulfide;

1.6. Alkylidene bisphenols: 2,2'-methylene-bis(6-tert-butyl-4-methylphenol), 2,2'-methylene-bis(6-tert-butyl-4-ethylphenol), 2,2'-methylene-bis[4-methyl-6-(.alpha.-methylcyclohexyl)phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylphenol), 2,2'-methylene-bis[6-(.alpha.-methylbenzyl)-4-nonylphenol], 2,2'-methylene-bis[6-(.alpha.,.alpha.-dimethyl-benzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)-butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphen yl]terephthalate, 1,1-bis(3,5-dimethyl-2-hydroxyphenyl)butane, 2,2-bis(3,5-di-tert-butyl-4-hydroxyphenyl)-propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane;

1.7. O-, N- and S-benzyl compounds: 3,5,3',5'-tetra-tert-butyl-4,4'-dihydroxydibenzyl ether, octadecyl-4-hydroxy-3,5-dimethylbenzyl-mercaptoacetate, tridecyl-4-hydroxy-3,5-di-tert-butylbenzyl-mercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzyl-mercaptoacetate;

1.8. Hydroxybenzylated malonates: dioctadecyl-2,2-bis(3,5-di-tert-butyl-2-hydroxybenzyl)malonate, dioctadecyl-2-(3-tert-butyl-4-hydroxy-5-methylbenzyl)malonate, didodecylmercaptoethyl-2,2-bis(3,5-di-tert-butyl-4-hydroxybenzyl) malonate, di[4-(1,1,3,3-tetramethylbutyl)-phenyl]-2,2-bis(3, 5-di-tert-butyl-4-hydroxybenzyl)malonate;

1.9. Hydroxybenzyl aromatic compounds: 1,3,5-tris(3,5-di-tert-butyl-4-hydroxybenzyl)-2,4,6-trimethylbenzene, 1,4-bis (3,5-di-tert-butyl-4-hydroxybenzyl)-2,3,5,6-tetramethylbenzene, 2,4,6-tris(3,5-di-tert-butyl-4-hydroxybenzyl)phenol;

1.10. Triazine compounds: 2,4-bis-octylmercapto-6-(3,5-di-tert-butyl-4-hydroxyanilino)-1,3,5-triazin e, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate;

1.11. Acylaminophenols: 4-hydroxylauric acid anilide, 4-hydroxystearic acid anilide, N-(3,5-di-tert-butyl-4-hydroxyphenyl)-carbamic acid octyl ester;

1.12. Esters of .beta.-(5-tert-butyl-4-hydroxy-3-methylphenyl) propionic acid: with polyhydric alcohols, e.g. with 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane;

1.13. Esters of .beta.-(3,5-di-tert-butyl-4-hydroxyphenyl) propionic acid, .gamma.-(3,5-dicyclohexyl-4-hydroxyphenyl) propionic acid, 3,5-di-tert-butyl-4-hydroxyphenylacetic acid: with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-hydroxyethyl oxalic acid diamide, 3-thiaundecanol, 3-thiapentadecanol, trimethylhexanediol, trimethylolpropane, 4-hydroxymethyl-1-phospha-2,6,7-trioxabicyclo [2.2.2]octane;

1.14. Amides of .beta.-(3,5-di-tert-butyl-4-hydroxyphenyl) propionic acid: N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine;

1.15. Ascorbic acid (vitamin C);

1.16. Aminic antioxidants: N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'dicyclohexyl-p- phenylenediamine, N,N'-diphenyl-p-phenylenediamine, N,N'-di(naphth-2-yl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfonamido)-diphenylamine, N,N'-dimethyl-N,N'-di-sec-butyl-p-phenylenediamine, diphenylamine, N-allyldiphenylamine, 4-isopropoxydiphenylamine, 4-n-butylaminophenol, 4-butyrylaminophenol, 4-nonanoylaminophenol, 4-dodecanoylaminophenol, 4-octadecanoylaminophenol, di(4-methoxyphenyl)amine, 2,6-di-tert-butyl-4-dimethylaminomethyl phenol, 2,4'-diaminodiphenylmethane, 4,4'-diaminodiphenylmethane, N,N,N',N'-tetramethyl-4,4'-diaminodiphenylmethane, 1,2-di[(2-methylphenyl)amino]-ethane, 1,2-di (phenylamino)propane, (o-tolyl)biguanide, di[4-(1',3'-dimethylbutyl)phenyl]amine, tert-octylated N-phenyl-1-naphthylamine, mixture of mono- and di-alkylated tert-butyl/tert-octyl-diphenylamines, mixture of mono- and di-alkylated nonyidiphenylamines, mixture of mono- and di-alkylated dodecyldiphenylamines, mixture of mono- and di-alkylated isopropyl/isohexyl-diphenylamines, mixtures of mono- and di-alkylated tert-butyldiphenylamines, 2,3-dihydro-3,3-dimethyl-4H-1,4-benzothiazine, phenothiazine, mixture of mono- and di-alkylated tert-butyl/tert-octyl-phenothiazines, mixtures of mono- and di-alkylated tert-octylphenothiazines, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin-4-yl)sebacate, 2,2,6,6-tetramethylpiperidin-4-one, 2,2,6,6-tetramethylpiperidin-4-ol.

2. Examples of further antioxidants: aliphatic or aromatic phosphites, esters of thiodipropionic acid or thiodiacetic acid or salts of dithiocarbamic acid, 2,2,12,12-tetramethyl-5,9-dihydroxy-3,7,11-trithiamidecane and 2,2,15,15-tetramethyl-5,12-dihydroxy-3,7,10,14-tetrathiahexadecane.

3. Examples of Metal Deactivators. e.g. for Copper:
3.1. Benzotriazoles and derivatives thereof: 2-mercaptobenzotriazole, 2,5-dimercaptobenzotriazole, 4- or 5-alkylbenzotriazoles (e.g. tolutriazole) and derivatives thereof, 4,5,6,7-tetrahydrobenzotriazole, 5,5'-methylene-bis-benzotriazole; Mannich bases of benzotriazole or tolutriazole, such as 1-[di (2-ethylhexyl)aminomethyl]tolutriazole and 1-[di(2-ethylhexyl)aminomethyl]benzotriazole; alkoxyalkylbenzotriazoles, such as 1-(nonyloxy-methyl)benzotriazole, 1-(1-butoxyethyl)-benzotriazole and 1-(1-cyclohexyloxybutyl)-tolutriazole;
3.2. 1,2,4-Triazoles and derivatives thereof: 3-alkyl-(or -aryl-) 1,2,4-triazoles, Mannich bases of 1,2,4-triazoles, such as 1-[di(2-ethylhexyl)aminomethyl]-1,2,4-triazole; alkoxyalkyl-1,2,4-triazoles, such as 1-(1-butoxyethyl)-1,2,4-triazole; acylated 3-amino-1,2,4-triazoles;
3.3. Imidazole derivatives: 4,4'-methylene-bis(2-undecyl-5-methyl) imidazole and bis[(N-methyl)imidazol-2-yl] carbinol-octyl ether;
3.4. Sulfur-containing heterocyclic compounds: 2-mercaptobenzothiazole, 2,5-dimercapto-1,3,4-thiadiazole, 2,5-dimercaptobenzothiadiazole and derivatives thereof; 3,5-bis[di(2-ethylhexyl)aminomethyl]-1,3,4-thiadiazolin-2-one;
3.5. Amino compounds: salicylidene-propylenediamine, salicylaminoguanidine and salts thereof.

4. Examples of Rust Inhibitors:
4.1. Organic acids, their esters, metal salts, amine salts and anhydrides: alkyl- and alkenylsuccinic acids and their partial esters with alcohols, diols or hydroxycarboxylic acids, partial amides of alkyl- and alkenyl-succinic acids, 4-nonylphenoxyacetic acid, alkoxy- and alkoxyethoxy-carboxylic acids, such as dodecyloxyacetic acid, dodecyloxy (ethoxy)acetic acid and amine salts thereof, and also N-oleoyl-sarcosine, sorbitan monooleate, lead naphthenate, alkenylsuccinic acid anhydrides, e.g. dodecenylsuccinic acid anhydride, 2-(2-carboxyethyl)-1-dodecyl-3-methylglycerol and salts thereof, especially sodium and triethanolamine salts thereof.

4.2. Nitrogen-containing Compounds:
4.2.1. Tertiary aliphatic or cycloaliphatic amines and amine salts of organic and inorganic acids, e.g. oil-soluble alkylammonium carboxylates, and 1-[N,N-bis(2-hydroxyethyl) amino]-3-(4-nonylphenoxy)propan-2-ol;
4.2.2. Heterocyclic compounds: substituted imidazolines and oxazolines, e.g. 2-heptadecenyl-1-(2-hydroxyethyl)-imidazoline;
4.2.3. Sulfur-containing compounds: barium dinonynaphthalene sulfonates, calcium petroleum sulfonates, alkylthio-substituted aliphatic carboxylic acids, esters of aliphatic 2-sulfocarboxylic acids and salts thereof.

5. Examples of viscosity index enhancers: polyacrylates, polymethacrylates, nitrogen containing polymethylmethacrylates, vinylpyrrolidone/methacrylate copolymers, polyvinylpyrrolidones, polybutenes, polyisobutylenes, olefin copolymers such as ethylene-propylene copolymers, styrene-isoprene copolymers, hydrated styrene-isoprene copolymers, styrene/acrylate copolymers and polyethers. Multifunctional viscosity improvers, which also have dispersant and/or antioxidancy properties are known and may optionally be used in addition to the products of this invention.

6. Examples of pour-point depressants: polymethacrylates, ethylene/vinyl acetate copolymers, alkyl polystyrenes, fumarate copolymers, alkylated naphthalene derivatives.

7. Examples of dispersants/surfactants: polybutenylsuccinic acid amides or imides, polybutenylphosphonic acid derivatives, basic magnesium, calcium and barium sulfonates and phenolates.

8. Examples of extreme-pressure and anti-wear additives: sulfur- and halogen-containing compounds, e.g. chlorinated paraffins, sulfurized olefins or vegetable oils (soybean oil, rape oil), alkyl- or aryl-di- or -tri-sulfides, benzotriazoles or derivatives thereof, such as bis(2-ethylhexyl)aminomethyl tolutriazoles, dithiocarbamates, such as methylene-bis-dibutyldithiocarbamate, derivatives of 2-mercaptobenzothiazole, such as 1-[N,N-bis(2-ethylhexyl)aminomethyl]-2-mercapto-1H-1,3-benzothiazole, derivatives of 2,5-dimercapto-1,3,4-thiadiazole, such as 2,5-bis(tert-nonyidithio)-1,3,4-thiadiazole.

9 Examples of coefficient of friction reducers: lard oil, oleic acid, tallow, rape oil, sulfurized fats, amides, amines. Further examples are given in EP-A-0 565 487.

10. Examples of special additives for use in water/oil metalworking fluids and hydraulic fluids: Emulsifiers: petroleum sulfonates, amines, such as polyoxyethylated fatty amines, non-ionic surface-active substances; buffers: such as alkanolamines; biocides: triazines, thiazolinones, tris-nitromethane, morpholine, sodium pyridenethiol; processing speed improvers: calcium and barium sulfonates.

The inventive pour point depressant may be admixed with the above-mentioned directly in a lubricant. It is also possible to prepare a concentrate or a so-called "additive pack", which can be diluted to give the working concentrations for the intended lubricant.

Lubricating oils containing the copolymers of the present invention may be used in a number of different applications including automatic transmission fluids, manual transmission fluids, hydraulic fluids, greases, gear fluids, metal-working fluids, engine oil applications and shock absorber fluids.

EXAMPLES

Example 1

Synthesis of Lauryl-Behenyl Methacrylate Copolymer-90/10 Monomer Weight Ratio 140 g of high temperature oil (neutral hydrotreated oil) is charged to a reactor and heated to 95° C. under nitrogen. T-butyl peroctoate, 0.406 g in 7.7 g of oil is added to the heated oil in the reactor. Two separate parallel feeds are setup for metering into the reactor. The first feed is made up of a mixture of 252.00 g of lauryl methacrylates, 28 grams of behenyl methacrylate, 1.12 grams of dodecyl mercaptan (DDM) and 235.20 grams of high temperature oil and is metered over a 2 hour period. The second feed consists of 1.22 g t-butyl peroctoate in 23.14 g of oil and is fed over a 3 hour period. Both first and second feeds are started simultaneously. At the end of 2 hours of feed, the second feed rate of the initiator is doubled. The reaction is held for an additional hour at 95° C. after which an additional charge of initiator, 0.560 g in 10.64 g oil is added to the reaction and held for one more hour at 95° C.

The average chain length for the lauryl methacrylate is about 12.6 carbons.

The average carbon chain length for the behenyl methacrylate is about 20.3 carbons.

The formed polyalkylmethacrylate (lauryl/behenyl polymethacrylate 90/10) formed in example 1 has an average chain length of about 13.4 carbons.

Example 2

Synthesis of Lauryl/"C30" Methacrylate Copolymer-90/10 Monomer Weight Ratio 100 g of high temperature oil (neutral hydrotreated oil) is charged to a reactor and heated to 95° C. under nitrogen. T-butyl peroctoate, 0.213 g in 4.05 g of oil is added to the heated oil in the reactor. Two separate parallel feeds are setup for metering into the reactor. The first feed is made up of a mixture of 180.1 g of lauryl methacrylates, 31.48 grams of "C30" methacrylate, 1.46 grams of dodecyl mercaptan (DDM) and 175.80 grams of high temperature oil and is metered over a 2 hour period. The first feed is also stirred and gently heated because the C30 methacrylate is not completely soluble in the base oil at room temperature. The second feed consists of 0.64 g t-butyl peroctoate in 12.14 g of oil and is fed over a 3 hour period. The first and second feeds are started simultaneously. At the end of 2 hours of feed, the second feed rate of the initiator is doubled. The reaction is held for an additional hour at 95° C. after which an additional charge of initiator, 0.29 g in 3.61 g oil is added to the reaction and held for one more hour at 95° C.

The average chain length of the C30 methacrylate is 30.4 carbons.

The average chain length of the formed polymethacrylate copolymer (90/10 lauryl/C30) of example 2 is 14.4.

TABLE I

The resulting composition of the poly alkyl methacrylate copolymer formed in example 1 is:

| Polymer Components | Weight % Based on Total Weight of Copolymer |
| --- | --- |
| Dodecylmethacrylate | 61 |
| Tetradecylmethacrylate | 23 |
| Hexadecylmethacrylate | 7 |
| Octadecylmethacrylate | 4 |
| Eicosylmethacrylate | 1 |
| Docosylmethacrylate | 4 |

TABLE 2

The resulting composition of the poly alkyl methacrylate copolymer formed in example 2 is:

| # of Carbons in Alkyl Chain | Weight % Based on Total Weight of Copolymer |
| --- | --- |
| 12 | 65.1 |
| 14 | 21.1 |
| 16 | 4.3 |
| 18 | 0.5 |
| 20 | 0.6 |
| 22 | 0.7 |
| 24 | 0.8 |
| 26 | 0.8 |
| 28 | 0.9 |
| 30 | 0.8 |
| 32 | 0.8 |
| 34 | 0.7 |
| 36 | 0.7 |
| 38 | 0.5 |
| 40 | 0.4 |
| 42 | 0.3 |
| 44 | 0.3 |
| 46 | 0.2 |
| 48 | 0.1 |
| 50 | 0.1 |
| 52 | 0.08 |
| 54 | 0.06 |
| 56 | 0.04 |
| 58 | 0.02 |

Application Data for Pour Point Depressant
Comparison of Viscosities at Low Temperatures The copolymer of example 1 and a commercial pour point depressant are each added separately to hydrotreated Group II mineral oil. The pour point and viscosities are recorded in Table 3.

TABLE 3

Properties of 0.2 weight percent of PPD in Group II hydrotreated mineral oil.

| PPD[1] | Pour Point (° C.) | Low Temp. BROOKFIELD Viscosity −35° C. (CP) | Kinematic Viscosity 40° C. (cSt) |
| --- | --- | --- | --- |
| Hydrotreated Group II oil | −18 | Too viscous to measure | 35.48 |
| Comparison[2] example | −42 (−39) | 244,000 | 35.82 |
| Example 1 | −45 | 80,600 | 35.5 |

1. Both example 1 and the comparative example are 40 weight % poly alkylmethacrylates in hydrotreated oil. 0.2 weight % of this solution is added to the hydrotreated oil to determine viscosity and pour point. Thus the 0.2 wet. % in Table 3 represents 0.08 wt. % actives (copolymer).

2. The comparison example is a commercially available poly alkyl methacrylate copolymer. The polymer is formed from long chain esters of methacrylate (=>C12). The pour point in parenthesis represents a second run of the same test.

The commercially available poly alkyl methacrylate copolymer is determined to be a distribution of primarily C12-C18 alkyl methacrylates. No C22 alkyl methacrylates was detected by pyrolysis GC/MS.

The Low Temperature BROOKFIELD viscosity is determined by ASTM D2983. Kinematic Viscosity is determined by ASTM D445. Pour point is determined by ASTM D5950.

Table 3 shows that example 1 (invention) has a significantly lower viscosity at low temperatures than the commercially available polyalkylmethacrylate.

Pour Point as a Function of Concentration

FIG. 1 illustrates the pour point as a function of concentration for a commercial pour point depressant and example 1 in an hydraulic type oil. The commercial pour point depressant is also a long chain poly alkyl methacrylate copolymer. The graph illustrates the surprising improved efficiency of example 1 as compared to the commercially available pour point depressant. Lower concentrations of example 1 are required to achieve the same or lower pour point values.

The FIG. 1 shows clearly that copolymer of example 1 at a concentration of 0.05 weight percent in the engine oil achieves the same viscosity profile as a 0.1 weight percent concentration for the commercially available pour point depressant. Thus the copolymer of example 1 is found to be twice as efficient as the commercial pour point depressant in achieving the same temperature/viscosity profile.

We claim:

1. A polyalkyl methacrylate copolymer comprising monomer units formed from:
   (A) about 60 to about 96, weight percent of a C12-C16 alkyl methacrylate;
   wherein component (A) comprises about 68 to about 74 percent C12 alkyl methacrylate, about 20 to about 26 weight percent C14 alkyl methacrylate and about 2 to about 6 weight percent C16 alkyl methacrylate based on the total weight of component (A); and
   (B) about 40 to about 4, weight percent of a C18-C30 alkyl methacrylate;
   wherein component (B) comprises about 40 to about 50 percent C18 alkyl methacrylate, about 5 to about 15 weight percent C20 alkyl methacrylate and about 40 to about 50 weight percent C22 alkyl methacrylate based on the total weight of component (B).

2. The copolymer of claim 1 wherein the copolymer has a weight average molecular weight of from about 5,000 to about 250,000.

3. The copolymer of claim 1 wherein the copolymer is linear, crosslinked, branched or structured.

4. The copolymer of claim 1 wherein component (A) is about 65 to about 95 weight percent of the formed poly alkyl methacrylate copolymer.

5. The copolymer of claim 1 wherein component (B) is about 35 to about 5 weight percent of the formed poly alkyl methacrylate copolymer.

6. The component (B) of claim 1 is a straight or branched alkyl ester of methacrylic acid selected from the group consisting of stearyl methacrylate, octadecyl methacrylate, heptadecyl methacrylate, nonadecyl meth acrylate, eicosyl methacrylate, henicosyl methacrylate, docosyl methacrylate, tricosyl methacrylate, tetracosylmethacrylate, pentacosyl methacrylate, hexacosyl methacrylate, hexacosyl methacrylate, octacosyl methacrylate, nonacosyl methacrylate, triacontyl methacrylate, behenyl methacrylate and mixture thereof.

7. The component (A) of claim 1 is a straight or branched alkyl ester of methacrylic acid selected from the group consisting of lauryl methacrylate, myristyl methacrylate, cetyl methacrylate, dodecyl methacrylate, tridecyl methacrylate, tetradecyl methacrylate, pentadecyl methacrylate, hexadecyl methacrylate and mixtures thereof.

8. A copolymer of claim 1 wherein component (A) is lauryl methacrylate and component (B) is behenyl methacrylate.

9. A copolymer of claim 1 wherein the (A) and (B) components are further defined as comprising a combined weight percent of C16 and C18 alkyl methacrylates which combined weight ranges from about a minimum of 7 weight percent to about a maximum of 23 weight percent based on the total weight of the poly alkyl methacrylate copolymer.

10. A copolymer of claim 1 wherein the (B) component is further defined as comprising a combined weight percent of =>C20 alkyl methacrylates which weight ranges from about a minimum of 2 weight percent to about a maximum of 40 weight percent based on the total weight of the poly alkyl methacrylate copolymer.

11. A copolymer of claim 1 wherein the (B) component is further defined as comprising a combined weight percent of C20-C22 alkyl methacrylates which weight ranges from about a minimum of 4 to about a maximum of 40 weight percent based on the total weight of the poly alkyl methacrylate copolymer.

12. A lubricating oil composition comprising:
    (i.) an oil of lubricating viscosity;
    (ii.) a poly alkyl methacrylate copolymer according to claim 1 and
    (iii.) optionally, other additives.

13. A lubricating oil composition according to claim 12, wherein the oil of lubricating viscosity is at least partially derived from a gaseous source.

14. The lubricating oil composition of claim 12 wherein component (ii.) is present in an amount of from 0.01 to about 5 parts by weight of active copolymer per 100 parts by weight of oil.

15. The lubricating oil composition of claim 14 wherein the component (ii.) is present in an amount of from 0.025 to about 1 part by weight of active copolymer per 100 parts by weight of oil.

16. The lubricating oil composition of claim 12 further comprising at least one additive selected from the group consisting of oxidation inhibitors, corrosion inhibitors, friction modifiers, antiwear and extreme pressure agents, detergents, dispersants, antifoamants, viscosity index improvers and additional pour point depressants.

17. The lubricating oil composition of claim 12 wherein the lubricating oil is an automatic transmission fluid, a manual transmission fluid, an hydraulic fluid, a grease, a gear fluid, a metal-working fluid, a crankcase engine oil or shock absorber fluid.

18. A method for improving the low temperature properties of a lubricating oil, said method comprises adding to an oil of lubricating viscosity a poly alkyl methacrylate copolymer according to claim 1.

19. A copolymer of claim 1 wherein component (B) comprises about 42 to about 48 percent C18 alkyl methacrylate, about 6.5 to about 12 weight percent C20 alkyl methacrylate and about 42 to about 48 weight percent C22 alkyl methacrylate based on the total weight of component (B).

* * * * *